US00RE42242E

(19) United States
(12) Reissued Patent
Struhsaker

(10) Patent Number: US RE42,242 E
(45) Date of Reissued Patent: Mar. 22, 2011

(54) APPARATUS AND METHOD FOR REALLOCATING COMMUNICATION RESOURCES TO ESTABLISH A PRIORITY CALL IN A FIXED WIRELESS ACCESS COMMUNICATION SYSTEM

(75) Inventor: Paul F. Struhsaker, Plano, TX (US)

(73) Assignee: Access Solutions, Ltd., Dallas, TX (US)

(21) Appl. No.: 12/179,437

(22) Filed: Jul. 24, 2008

Related U.S. Patent Documents

Reissue of:
(64) Patent No.: 7,031,738
Issued: Apr. 18, 2006
Appl. No.: 09/839,727
Filed: Apr. 20, 2001

U.S. Applications:
(60) Provisional application No. 60/270,385, filed on Feb. 21, 2001, provisional application No. 60/262,712, filed on Jan. 19, 2001, provisional application No. 60/262,825, filed on Jan. 19, 2001, provisional application No. 60/262,698, filed on Jan. 19, 2001, provisional application No. 60/262,827, filed on Jan. 19, 2001, provisional application No. 60/262, 826, filed on Jan. 19, 2001, provisional application No. 60/262,951, filed on Jan. 19, 2001, provisional application No. 60/262,824, filed on Jan. 19, 2001, provisional application No. 60/263,101, filed on Jan. 19, 2001, provisional application No. 60/263,097, filed on Jan. 19, 2001, provisional application No. 60/273,579, filed on Mar. 5, 2001, provisional application No. 60/262,955, filed on Jan. 19, 2001, provisional application No. 60/262,708, filed on Jan. 19, 2001, provisional application No. 60/273,689, filed on Mar. 5, 2001, provisional application No. 60/273,757, filed on Mar. 5, 2001, provisional application No. 60/270,378, filed on Feb. 21, 2001, and provisional application No. 60/270,430, filed on Feb. 21, 2001.

(51) Int. Cl.
*H04Q 7/20* (2006.01)

(52) U.S. Cl. ..... 455/521; 455/404; 455/414; 455/404.1; 455/404.2; 455/414.1

(58) Field of Classification Search ..... 455/521, 455/404.1, 404.2, 414.1, 414.2, 452.1, 422.1, 455/437, 509, 426.1; 370/338, 356
See application file for complete search history.

(56) References Cited

U.S. PATENT DOCUMENTS

| | | | | | |
|---|---|---|---|---|---|
| 5,638,371 | A | * | 6/1997 | Raychaudhuri et al. | 370/310.2 |
| 5,659,605 | A | * | 8/1997 | Voit et al. | 379/243 |
| 5,684,791 | A | * | 11/1997 | Raychaudhuri et al. | 370/310.2 |
| 5,694,424 | A | | 12/1997 | Ariyavisitakul | 375/233 |
| 5,809,086 | A | | 9/1998 | Ariyavisitakul | 375/332 |
| 5,884,148 | A | * | 3/1999 | Bilgic et al. | 455/74.1 |
| 5,991,292 | A | | 11/1999 | Focsaneanu et al. | 370/352 |
| 6,023,462 | A | | 2/2000 | Nieczyporowicz et al. | |
| 6,185,412 | B1 | * | 2/2001 | Pentikainen et al. | 455/404.1 |
| 6,188,873 | B1 | | 2/2001 | Wickman et al. | 455/11.1 |
| 6,324,384 | B1 | | 11/2001 | Nobuyasu et al. | |
| 6,600,914 | B2 | * | 7/2003 | Uhlik et al. | 455/404.1 |
| 7,035,241 | B2 | * | 4/2006 | Struhsaker | 370/338 |
| 7,274,946 | B2 | * | 9/2007 | Struhsaker | 455/521 |
| 2002/0065063 | A1 | * | 5/2002 | Uhlik et al. | 455/404 |
| 2002/0171581 | A1 | * | 11/2002 | Sheynblat et al. | 342/357.09 |

FOREIGN PATENT DOCUMENTS

| | | |
|---|---|---|
| EP | 0 304 955 | 3/1989 |
| WO | WO 98/24254 | 6/1998 |

* cited by examiner

*Primary Examiner*—Tan Trinh
(74) *Attorney, Agent, or Firm*—Byrne Poh LLP

(57) ABSTRACT

Apparatus, and an associated method, for a fixed wireless access communication system, by which to initiate a call to an emergency dispatch center, or other priority call to a priority location. When communication resources are initially unavailable to permit establishment of the call, normal call set-up procedures are emulated at a subscriber station from which the call is to be originated. Communication resources are reallocated in the communication system to permit the establishment of the call is thereafter established.

18 Claims, 4 Drawing Sheets

APPARATUS AND METHOD FOR REALLOCATING COMMUNICATION RESOURCES TO ESTABLISH A PRIORITY CALL IN A FIXED WIRELESS ACCESS COMMUNICATION SYSTEM

Matter enclosed in heavy brackets [ ] appears in the original patent but forms no part of this reissue specification; matter printed in italics indicates the additions made by reissue.

The present invention claims priority to U.S. Provisional Application Ser. No. 60/270,385 filed Feb. 21, 2001.

CROSS-REFERENCE TO RELATED APPLICATIONS

The present invention is related to those disclosed in the following U.S. Provisional and Non-Provisional Patent Applications:

1) Ser. No. 09/713,684 filed on Nov. 15, 2000, entitled "SUBSCRIBER INTEGRATED ACCESS DEVICE FOR USE IN WIRELESS AND WIRELESS ACCESS SYSTEMS";

2) Ser. No. 09/838,810, filed Apr. 20, 2001, entitled "WIRELESS COMMUNICATION SYSTEM USING BLOCK FILTERING AND FAST EQUALIZATION-DEMODULATION AND METHOD OF OPERATION";

3) Ser. No. 09/839,726, filed Apr. 20, 2001, entitled "APPARATUS AND ASSOCIATED METHOD FOR OPERATING UPON DATA SIGNALS RECEIVED AT A RECEIVING STATION OF A FIXED WIRELESS ACCESS COMMUNICATION SYSTEM";

4) Ser. No. 09/839,729, filed Apr. 20, 2001, entitled "APPARATUS AND METHOD FOR OPERATING A SUBSCRIBER INTERFACE IN A FIXED WIRELESS SYSTEM";

5) Ser. No. 09/839,719, filed Apr. 20, 2001, entitled "APPARATUS AND METHOD FOR CREATING SIGNAL AND PROFILES AT A RECEIVING STATION";

6) Ser. No. 09/838,910, filed Apr. 20, 2001, entitled "SYSTEM AND METHOD FOR INTERFACE BETWEEN A SUBSCRIBER MODEM AND SUBSCRIBER PREMISES INTERFACES";

7) Ser. No. 09/839,509, filed Apr. 20, 2001, entitled "BACKPLANE ARCHITECTURE FOR USE IN WIRELESS AND WIRELINE ACCESS SYSTEMS";

8) Ser. No. 09/839,514, filed Apr. 20, 2001, entitled "SYSTEM AND METHOD FOR ON-LINE INSERTION OF LINE REPLACEABLE UNITS IN WIRELESS AND WIRELINE ACCESS SYSTEMS";

9) Ser. No. 09/839,512, filed Apr. 20, 2001, entitled "SYSTEM FOR COORDINATION OF TDD TRANSMISSION BURSTS WITHIN AND BETWEEN CELLS IN A WIRELESS ACCESS SYSTEM AND METHOD OF OPERATION";

10) Ser. No. 09/839,259, filed Apr. 20, 2001, entitled "REDUNDANT TELECOMMUNICATION SYSTEM USING MEMORY EQUALIZATION APPARATUS AND METHOD OF OPERATION";

11) Ser. No. 09/839,457, filed Apr. 20, 2001, entitled "WIRELESS ACCESS SYSTEM FOR ALLOCATING AND SYNCHRONIZING UPLINK AND DOWNLINK OF TDD FRAMES AND METHODS OF OPERATION";

12) Ser. No. 09/839,075, filed Apr. 20, 2001, entitled "TDD FDD AIR INTERFACE";

13) Ser. No. 09/839,499, filed Apr. 20, 2001, entitled "APPARATUS, AND AN ASSOCIATED METHOD, FOR PROVIDING WLAN SERVICES IN A FIXED WIRELESS ACCESS COMMUNICATION SYSTEM";

14) Ser. No. 09/839,458, filed Apr. 20, 2001, entitled "WIRELESS ACCESS SYSTEM USING MULTIPLE MODULATION";

15) Ser. No. 09/839,456, filed Apr. 20, 2001, entitled "WIRELESS ACCESS SYSTEM AND ASSOCIATED METHOD USING MULTIPLE MODULATION FORMATS IN TDD FRAMES ACCORDING TO SUBSCRIBER SERVICE TYPE";

16) Ser. No. 09/838,924, filed Apr. 20, 2001, entitled "APPARATUS FOR ESTABLISHING A PRIORITY CALL IN A FIXED WIRELESS ACCESS COMMUNICATION SYSTEM";

17) Ser. No. 09/839,734, filed Apr. 20, 2001, entitled "METHOD FOR ESTABLISHING A PRIORITY CALL IN A FIXED WIRELESS ACCESS COMMUNICATION SYSTEM";

18) Ser. No. 09/839,513, filed Apr. 20, 2001, entitled "SYSTEM AND METHOD FOR PROVIDING AN IMPROVED COMMON CONTROL BUS FOR USE IN ON-LINE INSERTION OF LINE REPLACEABLE UNITS IN WIRELESS AND WIRELINE ACCESS SYSTEMS";

19) Ser. No. 60/262,712, filed on Jan. 19, 2001, entitled "WIRELESS COMMUNICATION SYSTEM USING BLOCK FILTERING AND FAST EQUALIZATIAON-DEMODULATION AND METHOD OF OPERATION";

20) Ser. No. 60/262,825, filed on Jan. 19, 2001, entitled "APPARATUS AND ASSOCIATED METHOD FOR OPERATING UPON DATA SIGNALS RECEIVED AT A RECEIVING STATION OF A FIXED WIRELESS ACCESS COMMUNICATION SYSTEM";

21) Ser. No. 60/262,698, filed on Jan. 19, 2001, entitled "APPARATUS AND METHOD FOR OPERATING A SUBSCRIBER INTERFACE IN A FIXED WIRELESS SYSTEM";

22) Ser. No. 60/262,827, filed on Jan. 19, 2001, entitled "APPARATUS AND METHOD FOR CREATING SIGNAL AND PROFILES AT A RECEIVING STATION";

23) Ser. No. 60/262,826, filed on Jan. 19, 2001, entitled "SYSTEM AND METHOD FOR INTERFACE BETWEEN A SUBSCRIBER MODEM AND SUBSCRIBER PREMISES INTERFACES";

24) Ser. No. 60/262,951, filed on Jan. 19, 2001, entitled "BACKPLANE ARCHITECTURE FOR USE IN WIRELESS AND WIRELINE SYSTEMS";

25) Ser. No. 60/262,824, filed on Jan. 19, 2001, entitled "SYSTEM AND METHOD FOR ON-LINE INSERTION OF LINE REPLACEABLE UNITS IN WIRELESS AND WIRELINE ACCESS SYSTEMS";

26) Ser. No. 60/263,101, filed on Jan. 19, 2001, entitled "SYSTEM FOR COORDINATION OF TDD TRANSMISSION BURSTS WITHIN AND BETWEEN CELLS IN A WIRELESS ACCESS SYSTEM AND METHOD OF OPERATION";

27) Ser. No. 60/263,097, filed on Jan. 19, 2001, entitled "REDUNDANT TELECOMMUNICATION SYSTEM USING MEMORY EQUALIZATION APPARATUS AND METHOD OF OPERATION";

28) Ser. No. 60/273,579, filed Mar. 5, 2001, entitled "WIRELESS ACCESS SYSTEM FOR ALLOCATING AND SYNCHRONIZING UPLINK AND DOWNLINK OF TDD FRAMES AND METHOD OF OPERATION";

29) Ser. No. 60/262,955, filed Jan. 19, 2001, entitled "TDD FDD AIR INTERFACE";

30) Ser. No. 60/262,708, filed on Jan. 19, 2001, entitled "APPARATUS, AND AN ASSOCIATED METHOD, FOR PROVIDING WLAN SERVICE IN A FIXED WIRELESS ACCESS COMMUNICATION SYSTEM";

31) Ser. No. 60/273,689, filed Mar. 5, 2001, entitled "WIRELESS ACCESS SYSTEM USING MULTIPLE MODULATION";

32) Ser. No. 60/273,757, filed Mar. 5, 2001, entitled "WIRELESS ACCESS SYSTEM AND ASSOCIATED METHOD USING MULTIPLE MODULATION FORMATS IN TDD FRAMES ACCORDING TO SUBSCRIBER SERVICE TYPE";

33) Ser. No. 60/270,378, filed Feb. 21, 2001, entitled "APPARATUS FOR ESTABLISHING A PRIORITY CALL IN A FIXED WIRELESS ACCESS COMMUNICATION SYSTEM"; and 24) Ser. No. 60/270,430, filed Feb. 21, 2001, entitled "METHOD FOR ESTABLISHING A PRIORITY CALL IN A FIXED WIRELESS ACCESS COMMUNICATION SYSTEM".

The above applications are commonly assigned to the assignee of the present invention. The disclosures of these related patent applications are hereby incorporated by reference for all purposes as if fully set forth herein. The present application hereby claims the benefit under Title 35, U.S. Code §119(e) of the above provisional and non-provisional U.S. Patent Applications.

TECHNICAL FIELD OF THE INVENTION

The present invention relates generally to a manner by which to initiate establishment of a priority call, such as a call to request emergency assistance in a FWA (fixed wireless access), or other, communication system. More particularly, the present invention relates to apparatus, and an associated method, by which to effectuate the priority call even when communication resources are not initially available to establish the call. The initial unavailability of the communication resources is not made known to the user initiating the call as normal system operation is emulated at a subscriber station from which the call originates. And, when the call is determined to be a priority call, the communication resources of the communication system are reallocated to provide communication resources to permit the establishment of the priority call.

BACKGROUND OF THE INVENTION

Telecommunications access systems provide for voice, data, and multimedia transport and control between the central office (CO) of the telecommunications service provider and the subscriber (customer) premises. Prior to the mid-1970s, the subscriber was provided phone lines (e.g., voice frequency (VF) pairs) directly from the Class 5 switching equipment located in the central office of the telephone company. In the late 1970s, digital loop carrier (DLC) equipment was added to the telecommunications access architecture. The DLC equipment provided an analog phone interface, voice CODEC, digital data multiplexing, transmission interface, and control and alarm remotely from the central office to cabinets located within business and residential locations for approximately 100 to 2000 phone line interfaces. This distributed access architecture greatly reduced line lengths to the subscriber and resulted in significant savings in both wire installation and maintenance. The reduced line lengths also improved communication performance on the line provided to the subscriber.

By the late 1980s, the limitations of data modem connections over voice frequency (VF) pairs were becoming obvious to both subscribers and telecommunications service providers. ISDN (Integrated Services Digital Network) was introduced to provide universal 128 kbps service in the access network. The subscriber interface is based on 64 kbps digitization of the VF pair for digital multiplexing into high speed digital transmission streams (e.g., T1/T3 lines in North America, E1/E3 lines in Europe). ISDN was a logical extension of the digital network that had evolved throughout the 1980s. The rollout of ISDN in Europe was highly successful. However, the rollout in the United States was not successful, due in part to artificially high tariff costs which greatly inhibited the acceptance of ISDN.

More recently, the explosion of the Internet and deregulation of the telecommunications industry have brought about a broadband revolution characterized by greatly increased demands for both voice and data services and greatly reduced costs due to technological innovation and intense competition in the telecommunications marketplace. To meet these demands, high speed DSL (digital subscriber line) modems and cable modems have been developed and introduced. The DLC architecture was extended to provide remote distributed deployment at the neighborhood cabinet level using DSL access multiplexer (DSLAM) equipment. The increased data rates provided to the subscriber resulted in upgrade DLC/DSLAM transmission interfaces from T1/E1 interfaces (1.5/2.0 Mbps) to high speed DS3 and OC3 interfaces. In a similar fashion, the entire telecommunications network backbone has undergone and is undergoing continuous upgrade to wideband optical transmission and switching equipment.

Similarly, wireless access systems have been developed and deployed to provide broadband access to both commercial and residential subscriber premises. Initially, the market for wireless access systems was driven by rural radiotelephony deployed solely to meet the universal service requirements imposed by government (i.e., the local telephone company is required to serve all subscribers regardless of the cost to install service). The cost of providing a wired connection to a small percentage of rural subscribers was high enough to justify the development and expense of small-capacity wireless local loop (WLL) systems.

Deregulation of the local telephone market in the United States (e.g., Telecommunications Act of 1996) and in other countries shifted the focus of fixed wireless access (FWA) systems deployment from rural access to competitive local access in more urbanized areas. In addition, the age and inaccessibility of much of the older wired telephone infrastructure makes FWA systems a cost-effective alternative to installing new, wired infrastructure. Also, it is more economically feasible to install FWA systems in developing countries where the market penetration is limited (i.e., the number and density of users who can afford to pay for services is limited to small percent of the population) and the rollout of wired infrastructure cannot be performed profitably. In either case, broad acceptance of FWA systems requires that the voice and data quality of FWA systems must meet or exceed the performance of wired infrastructure.

Wireless access systems must address a number of unique operational and technical issues including:

1) Relatively high bit error rates (BER) compared to wire line or optical systems; and 2) Transparent operation with network protocols and protocol time constraints for the following protocols:

a) ATM;

b) Class 5 switch interfaces (domestic GR-303 and international V5.2);

c) TCP/IP with quality-of-service QoS for voice over IP (VoIP) (i.e., RTP) and other H.323 media services;

d) Distribution of synchronization of network time out to the subscribers;

3) Increased use of voice, video and/or media compression and concentration of active traffic over the air interface to conserve bandwidth;

4) Switching and routing within the access system to distribute signals from the central office to multiple remote cell sites containing multiple cell sectors and one or more frequencies of operation per sector; and 5) Remote support and debugging of the subscriber equipment, including remote software upgrade and provisioning.

Unlike physical optical or wire systems that operate at bit error rates (BER) of $10^{-11}$, wireless access systems have time varying channels that typically provide bit error rates of $10^{-3}$ to $10^{-6}$. The wireless physical (PHY) layer interface and the media access control (MAC) layer interface must provide modulation, error correction and ARQ protocol that can detect and, where required, correct or retransmit corrupted data so that the interfaces at the network and at the subscriber site operate at wire line bit error rates.

The wide range of equipment and technology capable of providing either wireline (i.e., cable, DSL, optical) broadband access or wireless broadband access has allowed service providers to match the needs of a subscriber with a suitable broadband access solution. However, in many areas, the cost of cable modem or DSL service is high. Additionally, data rates may be slow or converge incomplete due to line lengths. In these areas and in areas where the high cost of replacing old telephone equipment or the low density of subscribers makes it economically unfeasible to introduce either DSL or cable modem broadband access, fixed wireless broadband systems offer a viable alternative. Fixed wireless broadband systems use a group of transceiver base stations to cover a region in the same manner as the base stations of a cellular phone system. The base stations of a fixed wireless broadband system transmit forward channel (i.e., downstream) signals in directed beams to fixed location antennas attached to the residences or offices of subscribers. The base stations also receive reverse channel (i.e., upstream) signals transmitted by the broadband access equipment of the subscriber.

Unfortunately, the diversity of broadband access technology has resulted in a lack of standardization in the broadband access equipment. Cable modems and DSL routers are incompatible with each other and with fiber optic equipment. Different service providers locate broadband access equipment in different locations on the subscriber premises. Often this equipment is located inside the office or residence of the subscriber, which makes it inaccessible to maintenance workers unless the subscriber is present to admit the workers to the premises. The lack of standardization of broadband access equipment and the frequent inaccessibility of such equipment adds to the cost and complexity of broadband access.

Therefore, there is a need in the art for broadband access equipment that can be readily and inexpensively deployed in the large domestic and international markets that are not currently served by wired or wireless broadband access technology. Further, there is a need for an apparatus to increase the communication capacity of the communication system.

Concentration techniques are utilized in construction of many multi-user communication systems. Concentration techniques, generally, refer to selection of the number of users permitted to be part of the system to be greater, by some factor, than the actual capacity of the communication system. Statistical, or other, analysis is made of the likely number of users of the communication system at any particular time, and the system is constructed to support a number of users based upon the expected number of users.

During times in which actual usage of the communication exceeds the capacity of the system, additional users, beyond the system's capacity, are prevented, or blocked, from access to the system.

When the communication system comprises a conventional wireline, telephone communication systems, the additional users are provided indication of their failure to access the system by alerting such users with audible alerts. The audible alerts are audibly distinct from normal dial tones generated during normal telephone operation.

In a fixed wireless access communication system, capacity limitations are possible between both the network infrastructure of the system and a correspondent node forming a terminating or originating station as well as, additionally, the radio links extending between the network infrastructure and the subscriber station.

When, for instance, a user at the subscriber station needs to place a priority call, such as a request for emergency assistance to an emergency dispatch center, access to the communication system to communicate with the emergency dispatch center is essential. A need therefore exists to provide access to a communication system to establish the priority call with the emergency dispatch center. It would also be desirable to provide a manner by which to operate the communication system in which the user is not made aware of an initial blockage from access to the system if access shall subsequently be granted.

It is in light of this background information related to radio communication systems that the significant improvements of the present invention have evolved.

SUMMARY OF THE INVENTION

The present invention, accordingly, advantageously provides apparatus, and an associated method, by which to initiate establishment of a priority call, such as a call to request emergency assistance, in a FWA (fixed wireless access), or other, communication system.

Through operation of an embodiment of the present invention, a manner is provided by which to effectuate the priority cell even when the communication resources are not initially available to establish the call.

When a call is initiated, the initial unavailability of the communication resources is not made known to the user initiating the call as normal system operation is emulated at the subscriber station at which the call is originated. The communication resources of the communication system are reallocated, when the call is determined to be a priority call, to provide communication resources to permit the establishment of the priority call.

In one aspect of the present invention, apparatus is provided for a subscriber station operable in a fixed wireless access communication system. When a priority call is originated at the subscriber station, the user of the subscriber station takes the telephonic station located thereat off-hook. When the telephone station is off-hook, a call establishment message is generated and sent by way of a radio link to network infrastructure of the fixed wireless access system.

The establishment message is generated as a precursor to a request to establish the call between the subscriber station and another communication station. Detection is made at the network infrastructure of the call establishment message. Responsive thereto, determination is made of the communication resource availability in the communication system to establish an additional call, of indeterminate priority. A response indicating whether communication resources are available in the communication system to establish the call of indeterminate priority is returned to the subscriber station.

A response detector at the subscriber station is coupled to receive indications of the response to the call establishment message. Indication of whether communication resources are available to establish the call is detected thereat. If communication resources are unavailable, a call set-up emulator is operable to emulate at the subscriber station normal call set-up operations. To the user of the subscriber station at which the call is initiated, call set-up operations appear to be normally progressing.

Dialing digits associated with the terminating station with which the call is to be established are entered at the subscriber station. A dialing digit signal is then sent to the network infrastructure. Determination is made at the network infrastructure of the priority to be associated with the call which is to be established. If the call is a priority call, such as a call to an emergency dispatch center, e.g., indicated by a pseudo-universal dialing code, such as 9-1-1, resource reallocations are effectuated to permit the establishment of the call. Thereafter, the call is established.

In one implementation, apparatus is provided for a subscriber station operable in the FWA system. A call set-up emulator is selectably operable to emulate normal call set-up operations at the subscriber station even when communication resources are not initially available to establish a call by the subscriber station. A dial-tone generator generates a dial tone audibly detected by the user of the subscriber station in which the call is originated. Dialing digits associated with the call originated at the subscriber station are also enterable in apparent normal fashion at the subscriber station. Upon subsequent reallocation of communication resources in the FWA communication system, the call establishment commences in normal manner.

In a further implementation, apparatus is provided for the network infrastructure of the FWA system, such as at an access processor or base transceiver station of the system. A detector is coupled to detect a call establishment message transmitted to the network infrastructure. Responsive to receipt of the call establishment message, determinations are made of the availability of communication resources to establish a call in the communication system. A response is then sent to the originating subscriber station. Thereafter, indications of the identity of the terminating station to which a call is to be established are received at the network infrastructure. If the identify of the terminating station indicates that the call is a priority call, reallocation of communication resources is made, if necessary, to permit the establishment of the call. If communication resources are not otherwise available, an ongoing communication session is terminated to provide the communication resources to effectuate the call.

In these and another aspects, therefore, apparatus, and an associated method, is provided for a multi-user FWA (fixed wireless access) communication system in which a plurality of subscriber stations are operable to communicate by way of radio links with network infrastructure to which an emergency dispatch center is coupled. A call request originated by a selected subscriber station is sent to the network infrastructure to request establishment of a call between the selected subscriber station and the emergency dispatch center. A communication resource availability determiner is operable responsive to receipt at the network infrastructure of the call request to determine whether communication resources are available to establish the call between the selected subscriber station and the emergency dispatch center. A resource reallocator is coupled to the communication resource availability determiner. The resource reallocator is selectably operable to reallocate communication resources in the FWA communication system to permit establishment of the call between the selected subscriber station and the emergency dispatch center.

The present invention will be better understood when read in light of the accompanying drawings which are described in the detailed description hereinbelow and in light of the claims appended hereto.

DETAILED DESCRIPTION OF THE INVENTION

Figure 1:
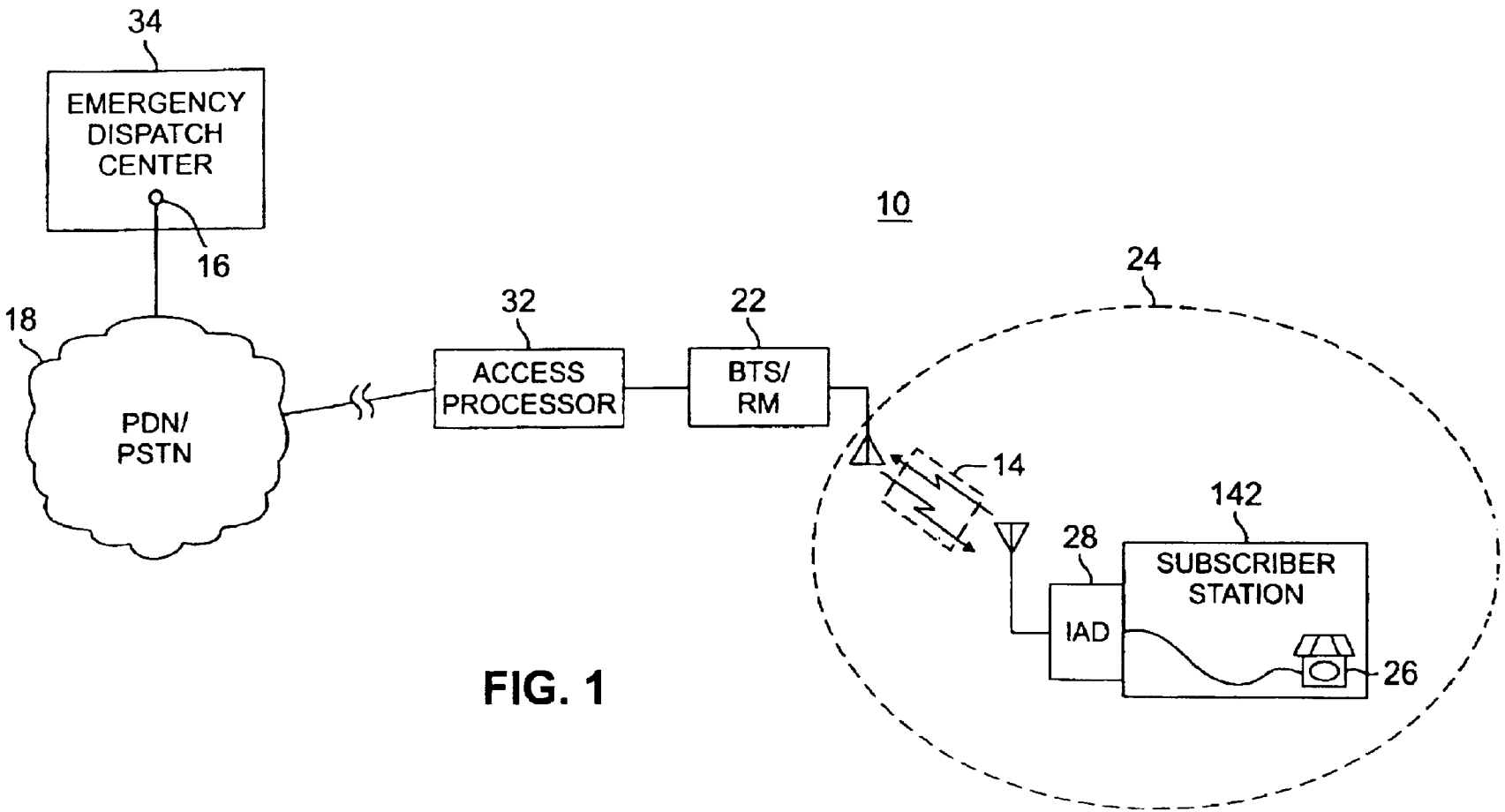
FIG. 1 illustrates a functional block diagram of an exemplary fixed wireless access (FWA) network in which an embodiment of the present invention is operable.

Referring first to FIG. 1, a communication system, shown generally at 10, provides for communications with the subscriber stations, of which the subscriber station 12 is exemplary. Communications are effectuated with the subscriber station by way of radio links formed upon an air interface 14. Data originated at an appropriately-positioned subscriber station can be communicated to a correspondent node, 16 by way of a communication path by way of the radio links formed upon the air interface. Data originated at the correspondent node 16 can be communicated upon a communication path formed between a correspondent node and a subscriber station. Two-way communication between the subscriber station and the correspondent node is thereby possible.

In the exemplary implementation, the communication system 10 forms a fixed wireless access (FWA) system coupled to a network backbone, of which the combined path data networks (PDN) and public-switched telephonic network (PSTN) 18 is representative in the figure.

While the following description of operation of an embodiment of the present invention shall describe its operation with respect to the exemplary implementation of the communication system shown in the figure, it should be understood that operation of an embodiment of the present invention is analogously also operable in other types of communication systems which use concentration techniques or otherwise are susceptible to access limitations.

The fixed wireless access system includes a plurality of base transceiver stations of which the base transceiver/remote modem (BTS/RM) 22 shown in the figure is exemplary. Each base transceiver station defines a cell. Here, the base transceiver station 22 defines a cell 24. The subscriber station 12 is here positioned at a location encompassed by the cell 24. A plurality of other subscriber stations are also positionable at locations encompassed by the cell 24. And, other subscriber stations positioned in other cells defined by other base transceiver stations typically form parts of a fixed wireless access communication system.

Concentration techniques are used in system construction. That is to say, system construction permits a high ratio of subscriber stations to base transceiver stations such that, if all of the subscriber stations simultaneously attempt to effectuate communication sessions, the communication capacity of the base transceiver stations would be exceeded. Through the use of concentration techniques, a statistical, or other, determination is made of an appropriate number of subscriber stations to be permitted to be associated with a particular base transceiver station. Not all of the subscriber stations are likely to attempt to effectuate simultaneous communication sessions, thereby permitting the number of permitted subscriber stations to be increased.

While any of the a large variety of different types of communications are effectuable, of significance to an embodiment of the present invention are telephonic communications originated at the subscriber station. A telephonic station 26 is here shown to be located at the subscriber station 12.

Use of the terminology communications by the subscriber station and by the telephonic station shall be used, at times, interchangeably below to indicate communications by the telephonic station with the correspondent node 16. And, while only a telephonic station 26 is shown to be positioned at the subscriber station, other types of communication devices such as computer stations and consumer-electronic devices, can also be represented at the subscriber station.

An integrated access device (IAD) 28 is also shown to be positioned at the subscriber station. The integrated access device (IAD) unit includes transceiver circuitry capable of communicating by way of the air interface with the base transceiver station 22. The telephonic station 26 is coupled to the integrated access device 28 and communications are effectuated with the subscriber station by way of the integrated access device.

The base transceiver station 22 forms a portion of the network infrastructure of the fixed wireless access system. Groups of base transceiver stations are coupled to an access processor (AP) 32. And, in turn, the access process is coupled to the network 18. During operation of an embodiment of the present invention, communication resources required to establish a call between the telephonic station 26 and the correspondence node 16 are selectably provided. Communication resources both at the air interface 14 and through the network 18 must be available to establish the call between the telephonic station 26 and the correspondent node 16.

Figure 2:
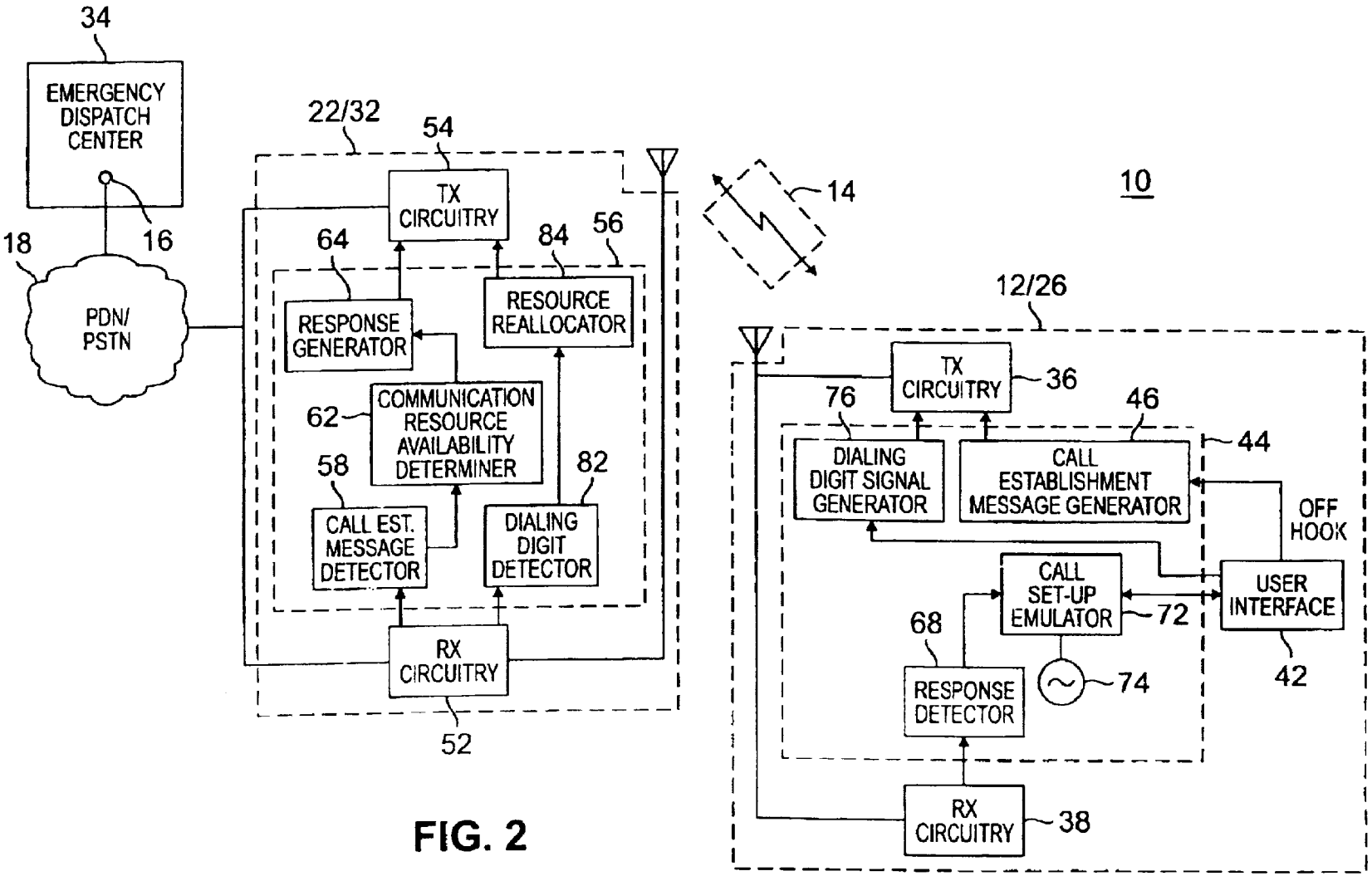
FIG. 2 illustrates a more detailed view of the fixed wireless access network in FIG. 1, according to an embodiment the present invention.

FIG. 2 illustrates portions of the communication system 10 to illustrate operation of an embodiment of the present invention. Operation of an embodiment of the present invention permits a user of the telephonic station 26 positioned at the subscriber station 12 to originate a call to an emergency dispatch center 34 at which the correspondent node 16 is located.

Elements shown in the figure are functional representations, portions of which are implemented, in exemplary implementation, as algorithms executable at processing devices. Additionally, functional operation of the various elements, or portion thereof, can be distributed at several locations or elements of the communication system. Here, for instance, the transmit and receive circuitry portions 36 and 38 are implemented at the integrated access device 28, at the telephonic station 26, or at other portions of the subscriber stations.

When a call is placed to the emergency dispatch center, a pseudo-universal dialing code, such as a 9-1-1 dialing code is entered at the telephonic station of the subscriber station.

A user interface 42 is also positioned at the subscriber station. The user interface includes, for instance, an actuation key pad located on the telephonic station which permits user actuation thereof to enter dialing digits associated with a terminating station such as the correspondent node 16 at the emergency dispatch center 34. The user interface is also representative of a hook switch associated with the telephonic station upon which a telephonic handset is conventionally positioned, to be removed therefrom when a call is to be initiated.

The user interface is coupled to apparatus 44 of an embodiment of the present invention. The apparatus 44 is formed of functional elements implemented, for instance, by algorithms executable by control circuitry.

Here, a call establishment message generator 46 is coupled to the user interface to receive indications of off-hook indications indicated thereat. An off-hook indication is indicated when a telephonic station is taken off the hook switch when a user intends to initiate a call with a terminating station. The call establishment message generator generates a call establishment message when the off-hook indication is provided thereto. The call establishment message is provided to the transmit circuitry 36 to be transmitted to the network infrastructure to inform the network infrastructure of the imminent request for establishment of a call with a terminating station.

The network infrastructure, here formed of both the base transceiver station 22 and access processor 32 is also shown to include both transmit circuitry and receive circuitry portions 52 and 54, respectively. The transmit and receive circuitry portions are implemented, for example, at the base transceiver station 22.

The call establishment message transmitted by the subscriber station to the network infrastructure is detected at the receive circuitry 52. Apparatus of an embodiment of the present invention, here referenced at 56 is coupled to the receive and transmit circuitry 52 and 54. Elements forming the apparatus 56 are also functionally represented and can be implemented in any of various manners, including by algorithms executable by control circuitry. And, the elements forming the apparatus 56 can be distributed at different locations of the network infrastructure or coupled thereto.

When a call establishment message is received at the receive circuitry, detection is made of its reception by a call establishment message detector 58. The call establishment message detector is coupled to a communication resource availability determiner 62. The communication resource availability determiner is operable at least responsive to detection of reception of the call establishment message at the network infrastructure. The communication resource availability determiner is operable to determine the availability of communication resources, both in the network 18 and upon the air interface 14, of communication resources to establish a call of indeterminate priority. Determinations are made, for instance, responsive to indications of other ongoing communication sessions with other subscriber stations as well as ongoing communication sessions making use of the network 18.

Determinations made by the determiner 62 are provided to a response generator 64. The response generator generates a response signal which is provide to the transmit circuitry 54. The response signal is transmitted by way of the air interface 14 to the subscriber station 12. The response serves to acknowledge reception at the network infrastructure of the call establishment message and also to provide an indication to the subscriber station of the availability of communication resources to establish a call originated at the subscriber station.

When the response is received at the receiver circuitry 38 of the subscriber station, a response detector 68 detects reception at the subscriber station of the response. If the response indicates that communication resources are unavailable to establish a call, originated at the subscriber station, an indication is provided to a call set-up emulator 72. The call set-up emulator is operable to emulate normal operation of call set-up procedures even though the response indicates the communication resources to be unavailable to establish the call. The call set-up emulator includes, for instance, a dial tone generator which generates a conventional telephone dial tone audibly detectable by a user of the telephonic station. Here, the oscillator 74 is representative of an oscillation signal used in the generation of a dial tone. The emulator is also coupled to the user interface 42 to receive indications of dialing digits or other actuator inputs input by way of the user interface. For instance when dialing digits are entered, the generated dial tone is terminated and appropriate audibly-detectable tones are generated responsive to the entry of the dialing digits or other input actuations.

Indications of the entered dialing digits are also provided to a dialing digit signal generator 76. The dialing signal generator generates a dialing digit signal which is provided to the transmit circuitry 36 to be transmitted to the network infrastructure.

When the dialing digit signal is received at the receive circuitry, detection of the signal is made by a dialing digit indication detector 82. The detector 82 detects the values of the dialing digits. Detection is at least made as to whether the values of the dialing digits are those corresponding to the emergency dispatch center, or other priority location. When detection is made of dialing digits corresponding to the emergency dispatch center, or other priority location, an indication of such is given to a resource reallocator 84. The resource reallocator is operable to reallocate the allocation of communication resources in the communication system to permit the establishment of the call between the subscriber station and the emergency dispatch center. Resource reallocation caused to be effectuated by the resource reallocator includes, for instance, termination of ongoing communication sessions to make available the communication resources to permit the call to the emergency dispatch carrier, or other priority location, to be established. Selection of which of the ongoing communication session, or sessions, to be terminated is made, for instance, upon random selection, or based upon subscription service levels to which the different subscriber stations have subscribed.

Thereby, a call is able to be established between the subscriber station and the emergency dispatch center, even when the communication resources are not initially available to permit the establishment of the call. And, through the use of the call set-up emulator at the subscriber station, the originator of the call is not made aware of the initial unavailability of the communication resources.

FIG. 3 again shows portions of the fixed wireless network, here shown at 300 of an embodiment of the present invention. The Fixed wireless network, is here show to include a subscriber integrated access device (SIAD) 304 located at a subscriber premises. The SIAD 304 includes radio circuitry 306 capable of transceiving radio signals. With a transceiver base station 308.

The radio circuitry 306 of the SIAD 304 is here capable of generating both voice and data packets, here represented by the blocks 312 and 314. The voice packages are representative of voice packets generated during operation of a telephony handset which is operable in convention manner but connected to the radio circuitry of the SIAD.

The transceiver base station is coupled to an access processor shelf 322 which here functionally is shown to include a table 324 at which active call information is stored, and a resource allocator 325 which allocates communication resources in the fixed wireless network.

The access processor communicates traffic and signaling information by way of the element 328 on the lines 332 with a network interface 334.

The network interface 334 is coupled to the PSTN/IP network 336.

The network 336, is in turn, connected to a communication station, here located at an emergency dispatch center 338.

A telephony handset located at the SIAD 304 can be used, for instance, to phone an emergency request for emergency assistance to personnel at the emergency dispatch center. The call, when established, permits a call originator who places the call to request emergency assistance.

Due to the potentially emergency nature of the call, it is essential that the call be established. Due to the use of concentrated techniques in system construction, there is a possibility that system capacity would not permit establishment of the call, and the request for emergency assistance at the emergency dispatch center would not be completed.

During operation of an embodiment of the present invention, a manner is provided by which to better assure that the call is established.

Figure 3:
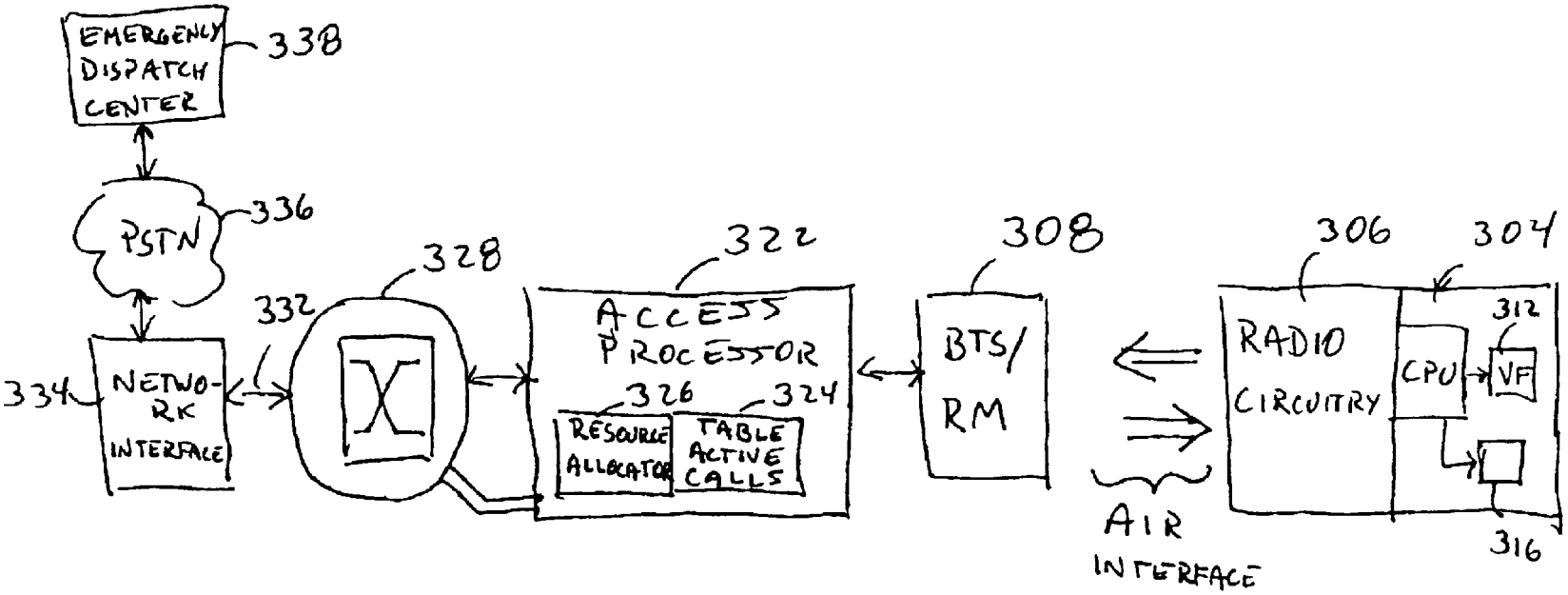
FIG. 3 illustrates a functional block diagram of portions of the fixed wireless access communication system shown in FIG. 1.
Figure 4:
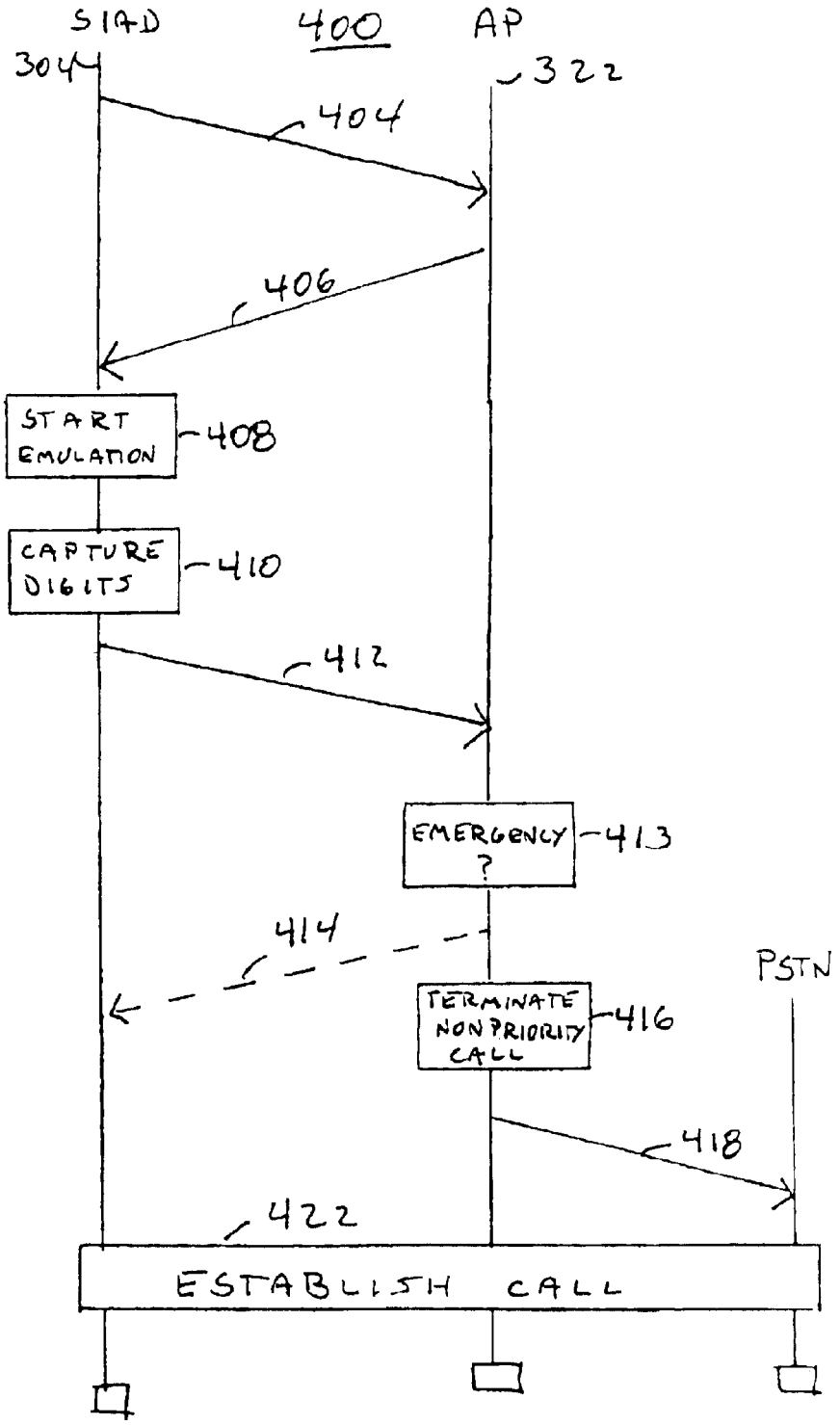
FIG. 4 illustrates a message sequence diagram exemplary of signaling generated during operation of the communication system shown in FIGS. 1 and 3 pursuant to an embodiment of the present invention.

FIG. 4 illustrates a message sequence diagram, shown generally at 400, representative of operation of a fixed wireless network shown in FIG. 3. Signaling is initiated at the SIAD 304 when a telephony handset is taken off-hook. As soon as the telephony handset is taken off-hook, a call establishment message is generated, indicated by the segment 404, and sent to the access processor 322. A determination is made as to whether resources are available to establish a call. In the exemplary scenario, resources are not available to establish a call, and an indication of the unavailability of the resources, indicated by the segment 406, is returned to the SIAD.

Upon receipt of the indication of the unavailability of the resources, normal call set-up procedures are emulated, indicated by the block 408, emulsion procedures include, for instances, generation of a dial tone which is local to the SIAD but otherwise appearing to be normal operation of the telephony handset to a user thereof. The user, upon detecting the dial tone, dials, or otherwise enters, digits associated with the emergency dispatch center, such as the emergency digits 9-1-1 forming a pseudo universal emergency number in the United States. The entered digits of the dialing code are captured, indicated at the block 410, and a digit message is generated and transmitted by the segment 412 to the access processor 322.

At the access processor a determination is made as to whether the values of the digits contain in the digital message are associated with the emergency dispatch center or are otherwise associated with the priority call. If not, a terminate call message indicated by the segment 414 is returned to the SIAD. A terminate call message is identified at the telephony handset at the SIAD as a fast busy signal.

If, conversely, the digit message is of values corresponding to an emergency dispatch center, or is otherwise representative of a priority call, a decision is made to permit the establishment of the call. To free resources to permit the establishment of the call, a nonpriority call is terminated, indicated by the block 416. A non priority call is terminated, such as by randomly terminating an active call selected from the table 324, (shown in FIG. 3). A priority might also be associated with the act of calls, and a lowest-priority act of call is first-terminated. Or a random termination of a lowest-priority call is performed. Thereby, resources are made available to establish the call between the telephony handset and the emergency dispatch center. Thereafter, and as indicated by the segment 418, a message is sent to the PSTN to cause a call to be established therethrough. Normal call operations, indicated by the block 422 is thereafter effectuated at the 911, or other priority call, continues until one side, or the other, of the communication sessions goes on-hook.

The previous descriptions are of preferred examples for implementing the invention, and the scope of the invention should not necessarily be limited by this description. The scope of the present invention is defined by the following claims.

What is claimed is:

1. In a multi-user FWA (fixed wireless access) communication system in which a plurality of subscriber stations are operable to communicate by way of radio links with network infrastructure to which a correspondent node is coupled, an improvement of apparatus for a selected subscriber station of the plurality of subscriber stations at which a priority call [of selected call-type] is selectably originated, said apparatus comprising:

a call establishment message generator coupled to receive an indication of initiation at the selected subscriber station of origination of the priority call, said call establishment message generator for generating a call establishment message for communication to the network infrastructure to initiate call set-up procedures precursing a request to establish the priority call between the selected subscriber station and the correspondent node;

a response detector coupled to receive an indication of a network-infrastructure generated response to the call establishment message generated by said call establishment message generator, said response detector for detecting whether the response to the call establishment message indicates communication resources to be available to establish the priority call; and a call set-up emulator coupled to said response detector, said call set-up emulator operable to emulate at the selected subscriber station normal call set-up operations thereat at least for a selected period responsive to detection by said response detector of unavailability of the communication resources to establish the priority call, wherein said correspondent node comprises an emergency dispatch center having a pseudo-universal dialing code associated therewith for *originating* said priority call and wherein the selected period is sufficient to determine whether the pseudo-universal dialing code has been dialed at the selected subscriber station.

2. The apparatus of claim 1 wherein said call set-up emulator comprises a dial-tone generator, said dial-tone generator for generating an audio dial-tone at the selected subscriber station responsive to detection by said response detector of the unavailability of the communication resources.

3. The apparatus of claim 2 wherein said *selected* subscriber station comprises a telephonic station having an actuation keypad actuatable by a user to enter dialing digits associated with the correspondent node and wherein generation of the audio dial-tone by said dial-tone generator is terminated upon commencement of entry of the dialing digits.

4. The apparatus of claim 3 further comprising a dialing-digit signal generator coupled to receive indications of entry of the dialing digits at the actuation keypad said dialing-digit signal generator for generating a dialing-digit indication signal for communication to the network infrastructure pursuant to the request to establish the *priority* call between the *selected* subscriber station and the correspondent node.

[5. The apparatus of claim 4 wherein the correspondent node comprises an assistance center having a dialing code formed of dialing digits associated with the assistance center, wherein the call of the selected call-type comprises a priority call, and wherein the dialing-digit signal generated by said dialing-digit signal generator is of values corresponding to the dialing code associated with the assistance center when the user actuates the actuation keypad to cause entry of the dialing digits forming the dialing code associated with the assistance center.]

[6. The apparatus of claim 5 wherein the assistance center comprises said emergency dispatch center having said pseudo-universal dialing code associated therewith, wherein the priority call comprises an emergency call, and wherein the dialing-digit signal generated by said dialing-digit signal generator is of values corresponding to the pseudo-universal dialing code associated with the emergency dispatch center when the user actuates the actuation keypad to cause entry of the dialing digits forming the pseudo-universal dialing code.]

7. In the multi-user FWA communication system of claim 1, a further improvement of apparatus for the network infrastructure, said apparatus comprising:

a call establishment message detector coupled to receive indications of receipt at the network infrastructure of the call establishment message; and a response generator coupled to said call establishment message detector, said response generator for generating the response of the call establishment message.

8. The apparatus of claim 7 further comprising a communication resource availability determiner operable responsive to detection of the call establishment message by said call establishment message detector, said communication resource availability determiner for determining whether communication resources are available to establish the *priority* call.

9. The apparatus of claim 8 wherein the network infrastructure is coupled to the correspondent node by way of a network backbone, and wherein said communication resource availability determiner determines both whether communication resources are available upon the network backbone to establish the *priority* call and whether communication resources are available upon the radio links to establish the *priority* call.

10. The apparatus of claim 8 wherein the *selected* subscriber station further sends a dialing digit indication signal to the network infrastructure and wherein said apparatus for the network infrastructure further comprises a dialing digit indication detector coupled to receive indications of receipt at the network infrastructure of the dialing digit indication signal.

11. The apparatus for the network infrastructure of claim 10 further comprising a resource reallocator coupled to said dialing digit indication detector and to said resource availability determiner, said resource reallocator selectably operable to reallocate communication resources in the multi-user FWA communication system responsive to selected values contained in the dialing digit indication signal detected by said dialing digit indication device.

12. The apparatus of claim 11 wherein [the correspondent node comprises said emergency dispatch center having said pseudo-universal dialing code associated therewith, wherein] the dialing digit indication signal to which said dialing digit indication detector is coupled to receive indications thereof is of values corresponding to the pseudo-universal dialing code and wherein said resource allocator reallocates the communication resources to provide communication resources to establish [a] *the priority* call between the *selected* subscriber station and the emergency dispatch center.

13. The apparatus of claim 12 wherein the communication resources of the FWA communication system are utilized pursuant to a plurality of communication resources with a plurality of subscriber stations and wherein reallocation made by said resource reallocator include termination of selected communication resources, thereby to reallocate resources to establish the *priority* call between the *selected* subscriber station and the emergency dispatch center.

14. The apparatus of claim 13 wherein the communication sessions have priority levels associated therewith and wherein selection of termination *of* selected communication sessions is made responsive to the priority levels associated with the communication sessions.

15. In a multi-user FWA (fixed wireless access) communication system in which a plurality of subscriber stations are operable to communicate by way of radio links with network infrastructure to which a correspondent node is coupled, a method for a selected subscriber station of the plurality of subscriber stations to selectably originate a priority call[of selected call-type], said method comprising:

receiving an indication of initiation at the selected subscriber station of origination of the priority call;

generating a call establishment message for communication to the network infrastructure to initiate call set-up procedures precursing a request to establish the priority call between the selected subscriber station and the correspondent node, wherein said correspondent node comprises an emergency dispatch center having a pseudo-universal dialing code associated therewith for said priority call;

receiving an indication of a network-infrastructure generated response to the call establishment message;

detecting whether the response to the call establishment message indicates communication resources to be available to establish the priority call; and responsive to detection of unavailability of the communication resources to establish the priority call, emulating normal call set-up operations at the selected subscriber station at least for a selected period sufficient to determine whether the pseudo-universal dialing code has been dialed at the selected subscriber station.

16. The method of claim 15, further comprising:

generating an audio dial-tone at the selected subscriber station responsive to detection by said response detector of the unavailability of the communication resources.

17. The method of claim 15, further comprising:

generating a dialing-digit indication signal for communication to the network infrastructure pursuant to the request to establish the priority call between the *selected* subscriber station and the correspondent node.

18. The method of claim 15 wherein emulation of normal call set-up operations at the selected subscriber station at least terminates in response to determination that the pseudo-universal dialing code has not been dialed at the selected subscriber station.

19. The method of claim 15, further comprising:

terminating use of selected communication resources of the FWA communication system by one of a plurality of subscriber stations; and reallocating said selected communication resources to establish the priority call from the subscriber *selected* station.

20. The method of claim 19, wherein communication sessions for the FWA communication system have priority levels associated therewith and wherein selection of said selected communication resources for termination is made responsive to the priority levels associated with the communication sessions.

* * * * *